United States Patent
Soppin et al.

(10) Patent No.: US 11,487,571 B2
(45) Date of Patent: Nov. 1, 2022

(54) METHOD AND SYSTEM FOR EFFICIENT UTILIZATION OF RESOURCES IN CONTAINERS

(71) Applicant: Wipro Limited, Bangalore (IN)

(72) Inventors: Shashidhar Soppin, Bangalore (IN); Chandrashekar Bangalore Nagaraj, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 199 days.

(21) Appl. No.: 16/914,571

(22) Filed: Jun. 29, 2020

(65) Prior Publication Data

US 2021/0303328 A1 Sep. 30, 2021

(30) Foreign Application Priority Data

Mar. 30, 2020 (IN) .............................. 202041013880

(51) Int. Cl.
*G06F 9/455* (2018.01)
*G06F 9/50* (2006.01)
*G06F 9/48* (2006.01)

(52) U.S. Cl.
CPC ........ *G06F 9/45558* (2013.01); *G06F 9/4881* (2013.01); *G06F 9/5005* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,886,307 B2* | 2/2018 | Hildrum | G06F 9/5011 |
| 9,888,067 B1* | 2/2018 | Yemini | H04L 67/1008 |
| 9,996,380 B2* | 6/2018 | Singh | G06F 9/45533 |
| 10,387,204 B2* | 8/2019 | Patgar | G06F 9/45558 |
| 10,572,306 B2* | 2/2020 | Kambatla | G06F 9/5038 |
| 10,749,813 B1* | 8/2020 | Zhao | H04L 47/805 |
| 11,025,495 B1* | 6/2021 | Bhatnagar | G06F 9/5011 |

(Continued)

OTHER PUBLICATIONS

IBM Cloud Learn Hub, "Containerization", https://www.ibm.com/cloud/learn/containerization#toc-microservi-mCC8udea, IBM Cloud Learn Hub, May 15, 2019. 11 pages.

(Continued)

*Primary Examiner* — Van H Nguyen
(74) *Attorney, Agent, or Firm* — Finnegan, Henderson, Farabow, Garrett & Dunner, LLP (57) ABSTRACT

A method and system for allocating resources to containers includes receiving a plurality of resource allocation requests from a plurality of containers, receiving a preference of a container from each of the plurality of containers, determining a priority-sequence for the plurality of containers, allocating a first associated resource for an associated first time-period to each container of the plurality of containers, determining a current consumption of the first associated resource by each container of the plurality of containers during the associated first time-period, and allocating a second associated resource to each container of the plurality of containers based on the current consumption of the first associated resource by each container of the plurality of containers.

12 Claims, 7 Drawing Sheets

(56) References Cited

U.S. PATENT DOCUMENTS

| | | | | |
|---|---|---|---|---|
| 2016/0162320 A1* | 6/2016 | Singh | .................... | G06F 9/5005 |
| | | | | 718/1 |
| 2018/0074855 A1* | 3/2018 | Kambatla | ............... | G06F 9/505 |
| 2021/0109772 A1* | 4/2021 | Jaloma | ................ | G06F 9/45558 |

OTHER PUBLICATIONS

Eldridge, I., "What is Container Orchestration?", https://blog.newrelic.com/engineering/container-orchestration-explained/, New Relic, Jul. 17, 2018. 8 pages.

Huang, H., et al., "Adaptive Resource Views for Containers", Cloud Systems, HPDC, 2019. pp. 243-254.

\* cited by examiner

```
docker run -it -m=100M --memory-swap=100M centos free -h
         total    used    free    shared  buff/cache  available
Mem:     995M     72M     113M    179M    809M        503M
Swap:    1.1G     0B      1.1G docker run -it -m=100M --memory-swap=100M ubuntu free -h
         total    used    free    shared  buff/cache  available
Mem:     995M     70M     115M    179M    809M        505M
Swap:    1.1G     0B      1.1G docker run -it -m=100M --memory-swap=100M debian free -h
                 total    used    free    shared  buffers  cached
Mem:             995M     882M    112M    179M    20M      695M
-/+ buffers/cache:        159M    836M
Swap:            1.1G     0B      1.1G
```

METHOD AND SYSTEM FOR EFFICIENT UTILIZATION OF RESOURCES IN CONTAINERS

TECHNICAL FIELD

The present disclosure relates generally to containerization and more particularly to method and system for allocating resources to containers.

BACKGROUND

While considering containerized environment, there are many techniques available for allocating resources (for example, a CPU and a memory) to different micro-services (for example, containers and cloud). Typically, allocation of the resources is performed before initialization or execution of the resources. However, the micro-services during run-time may demand additional resources due to insufficient current resources. So, the micro-services must wait for some period for re-allocation of resources. Also, the run-time resource re-allocation may be performed based on completion of at least one microservice and accordingly a freed-up space by the at least one microservice may be used for re-allocation. This type of run-time re-allocation may make the system inefficient. Additionally, a system that uses this type of run-time re-allocation may lack in monitoring resource utilization for further re-allocation of resources in real-time, thereby causing low resource utilization.

Various conventional systems and methods are available for allocating resources to the micro-services. However, some of the conventional systems and methods statically perform resource allocation before execution of the micro-services. Therefore, a dynamic allocation of an additional resource may require re-booting of the entire containerized environment. That may result in a lot of processing and time lag to identify available resources.

Additionally, some conventional systems and methods may perform calculations in a similar way for all the micro-services to identify the resources. Applications running on different micro-services may differ from each other in terms of resource consumption rate, time consumption, or any other aspect. Thus, re-allocation of the resources may be inefficient, for example, the applications that require resources in near future may lack in finding required resource and must wait for the resource re-allocation. Further, the conventional systems and methods do not consider priority and criticality of the micro-services running on each of the containers, i.e., there may be a possibility that resources from a critical container may be allocated to a non-critical container. This may cause the critical microservices to wait for the resources and makes the system inefficient.

SUMMARY

In one embodiment, a method of allocating resources to containers is disclosed. In one example, the method may include receiving a plurality of resource allocation requests from a plurality of containers. The method may further include receiving a selection of a preferred container from each of the plurality of containers for allocating a resource. It should be noted that the preference from each of the plurality of containers may be received via a polling session and the preference may be based on the criticality of requirement associated with each container of the plurality of containers. The method may further include determining a priority-sequence for the plurality of containers for allocating resources based on the preference from each of the plurality of containers. The method may further include allocating a first associated resource for an associated first time-period to each container of the plurality of containers, based on the priority-sequence. The method may further include determining a current consumption of the first associated resource by each container of the plurality of containers during the associated first time-period. The method may further include allocating a second associated resource to each container of the plurality of containers based on the current consumption of the first associated resource by each container of the plurality of containers.

In another embodiment, a system for allocating resources to containers is disclosed. In one example, the system may include a processor and a memory communicatively coupled to the processor. The memory may store processor-executable instructions, which, on execution, may cause the processor to receive a plurality of resource allocation requests from a plurality of containers. The processor-executable instructions, on execution, may further cause the processor to receive a selection of a preferred container from each of the plurality of containers for allocating a resource upon receiving the plurality of resource allocation requests. It should be noted that the preference from each of the plurality of containers may be received via a polling session and the preference may be based on the criticality of requirement associated with each container of the plurality of containers. The processor-executable instructions, on execution, may further cause the processor to determine a priority-sequence for the plurality of containers for allocating resources, based on the preference from each of the plurality of containers. The processor-executable instructions, on execution, may further cause the processor to allocate a first associated resource for an associated first time-period to each container of the plurality of containers, based on the priority-sequence. The processor-executable instructions, on execution, may further cause the processor to determine a current consumption of the first associated resource by each container of the plurality of containers during the associated first time-period. The processor-executable instructions, on execution, may further cause the processor to allocate a second associated resource to each container of the plurality of containers, based on the current consumption of the first associated resource by each container of the plurality of containers.

In yet another embodiment, a non-transitory computer-readable medium storing computer-executable instruction for allocating resources to containers is disclosed. In one example, the stored instructions, when executed by a processor, may cause the processor to perform operations including receiving a plurality of resource allocation requests from a plurality of containers. The operations may further include receiving a selection of a preferred container from each of the plurality of containers for allocating a resource. It should be noted that the preference from each of the plurality of containers may be received via a polling session and the preference may be based on the criticality of requirement associated with each container of the plurality of containers. The operations may further include determining a priority-sequence for the plurality of containers for allocating resources, based on the preference from each of the plurality of containers. The operations may further include allocating a first associated resource for an associated first time-period to each container of the plurality of containers, based on the priority-sequence. The operations may further include determining a current consumption of the first associated resource by each container of the plurality of containers during the associated first time-period. The operations may further include allocating a second associated resource to each container of the plurality of containers, based on the current consumption of the first associated resource by each container of the plurality of containers.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
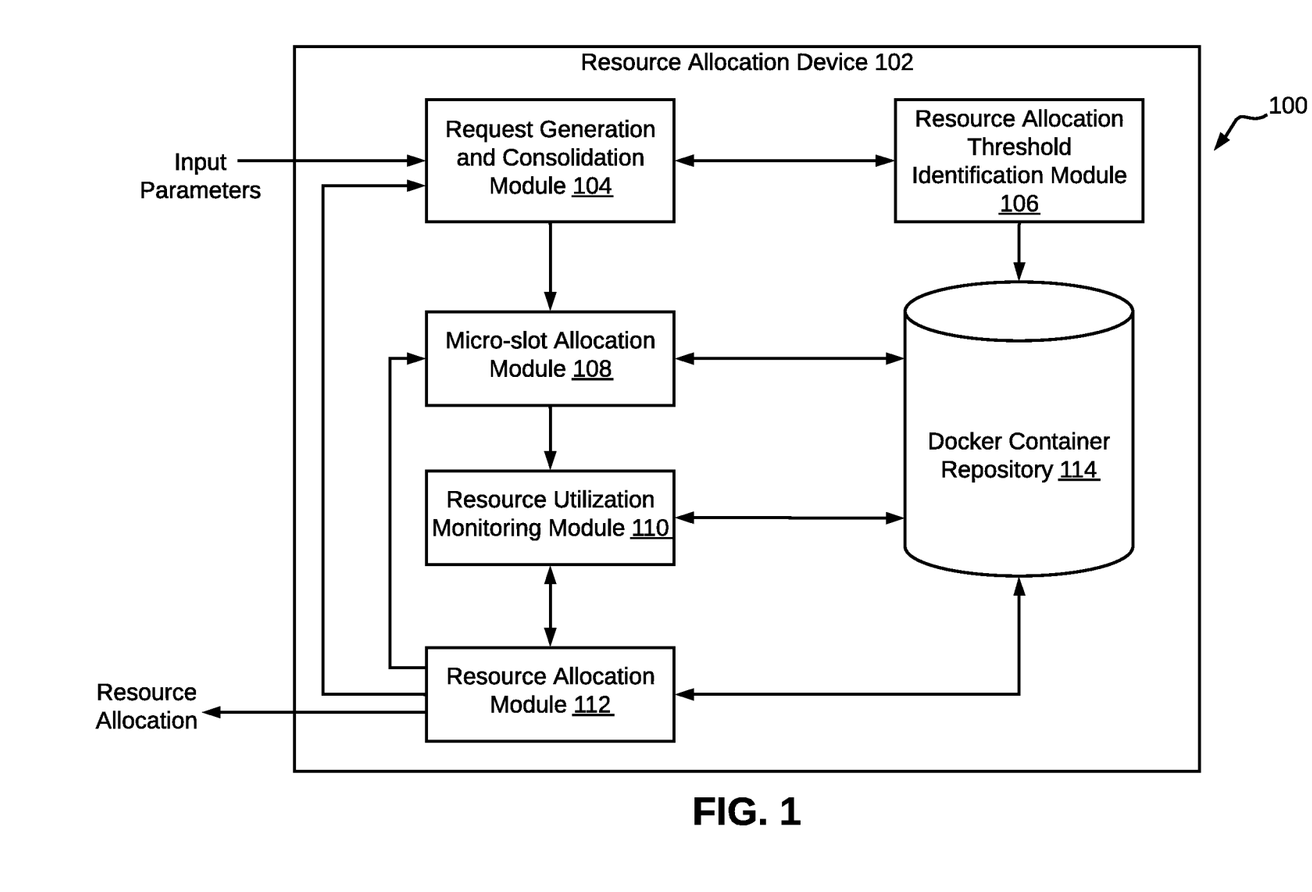
FIG. 1 is a block diagram of an exemplary system for allocating resources to containers, in accordance with some embodiments of the present disclosure.

Referring now to FIG. 1, an exemplary system 100 for allocating resources to containers is illustrated, in accordance with some embodiments of the present disclosure. The system 100 includes a resource allocation device 102 that may further include a request generation and consolidation module 104, a resource allocation threshold identification module 106, a micro-slot allocation module 108, a resource utilization monitoring module 110, a resource allocation module 112, and a docker container repository 114. As will be discussed in greater detail below, the resource allocation device 102 includes various modules to perform different operations intending to allocate the resources to the containers effectively. Each of these modules 104-114 will be described in greater detail below.

Each of a plurality of container images, created in a containerized environment, may be assigned with a container ID. The container ID may correspond to an ephemeral ID that may exist till a container is live. Once the system 100 is rebooted, restarted or shutdown, the container images may be erased and again available when the system 100 is live.

The request generation and consolidation module 104 may be configured to receive input parameters from within the system 100. Further, the request generation and consolidation module 104 may manage requirements of the containers for the resources. In other words, function of the request generation and consolidation module 104 is to identify appropriate requirements of the resources by the containers, such that, other critical micro-services may not get affected. In some embodiments, a container resource requirement management unit (not shown in FIG. 1) may include the request generation and consolidation module 104. In the containerized environment, monolithic and traditional applications may be broken down into a plurality of micro-services that may be a popular architecture for isolating problems and breaking down the monolithic applications. It should be noted, there may be one or more than one container running in any Docker Swarm® or Kubernetes® environment. When the monolithic applications are broken-down into smaller microservices, they may require the resources such as Central Processing Unit (CPU), memory, and storage to run. All these may contend for getting the required resources in a virtual environment. Sometimes large and resource hungry micro-services may consume more CPU or memory and may not release them back to a mainstream virtual environment.

The CPU and memory may be reserved for a particular container for a specific time. In case, the same container starts consuming more memory, then it may be difficult to stop this from happening. It should be noted that the memory limits are decided by "cgroup", not by "namespaced" daemon. There may be a "mem_cgroup" reference as a data structure that keeps track of "cgroup" semantics for memory limiting and accounting. When, there is a situation of Out of Memory (OOM), then only a fresh and an extra memory may be allocated. The "cgroup" data structure may refer some page counters (memory and swap, for instance) that are defined by a "page_counter" structure. This may be responsible for keeping track of usage and accordingly a limiting functionality may be provided when someone tries to acquire a page (say, a memory request).

Similarly, in case of CPUs, "vCores" may be created, using hyperthreading for CPU virtualization, in any system with total available CPUs. The "vCores" may be further assigned to each instance (containing container) based on limits that are used to assign the CPUs. A polling mechanism may be devised using advanced security mechanisms. It is already discussed that each of the containers are tagged with a unique container Identifier (ID), and that may be used to perform polling. Each of the containers may be treated as a block, in a blockchain and may be linked to their previous container. This may be referred to as ordered data structures that include all the required blocks as the containers. A new container being created may further be added into this blockchain on top in order to form a stack.

Each block in the stack may be identified by a hash placed on a header associated with each block of the blockchain. In some embodiments, the hash may be generated using a SHA-256 technique (for example, a Secure Hash Algorithm) to generate an idiosyncratic fixed-size-256-bit hash key.

Based on an overall agreement of all the containers participating in the polling, a priority and criticality list of containers may be created. In the priority and criticality list, only highly critical containers may be allowed to get maximum unlimited number of resources (CPU/Memory).

Further, the request generation and consolidation module 104 may be used to consolidate the authentications and/or approvals regarding the resource requirement from all the containers participating in polling. When any critical container instance requires more CPU and memory as compared to other instances of the running container, the CPU and memory allocation may be performed by the request generation and consolidation module 104. This may ensure that the critical container instances (say machine critical) only get more or the required CPU and the memory. Additionally, the request generation and consolidation module 104 monitors unnecessary holding or consumption of the CPU and the memory in the system 100.

Based on the overall polls that are supporting a particular container, the container may be identified once the polling is done. It should be noted, maximum polls may be casted to the critical and priority-based container as identified. All the containers except the critical container are in an agreement for releasing and allocating the necessary CPU and memory resources to the critical container from a main repository. Once all the containers decide to release the memory, this may not be held back. If a change in decision is required, all the other containers except the critical container must go back for authentication. Further the request generation and consolidation module 104 is operatively coupled the resource allocation threshold identification module 106, the micro-slot allocation module 108, the resource utilization monitoring module 110, and the resource allocation module 112 as depicted in FIG. 1.

The resource allocation threshold identification module 106 may be configured to receive the container IDs and time stamps of creation details from the request generation and consolidation module 104. The resource allocation threshold identification module 106 may generate and check threshold values or threshold limits for the CPU and the memory to be identified. Beyond a threshold limit of the CPU, a server or a node running the container instances may start performing inappropriately. The threshold limit for the CPU may be selected from the "UTIL_THRSHD" and from the "sys_namespace" utility of a host Operating System (OS). The threshold limit may be set to 95%. In case, the system does not have idle CPU time, then only the threshold limit is decreased by '1' unit in each instance. Dynamically these values may be adjusted with effective CPU values so that the actual CPU allocation for the container may not get affected. It may be noted that changes to the effective CPU values are limited to '1' unit per update to prevent abrupt fluctuations.

The memory threshold limit may be checked based on a process "kswapd" daemon, that may be used to reclaim the memory or reset a container's effective memory to a soft limit. There may be two flags "soft_limit_in_bytes" and "limit_in_bytes" that may be further checked periodically to get updates on the effective memory when the update timer fires. Any container is capable of using more memory than the soft limit threshold, when there is free memory available in the system 100. However, this request may be killed or trigger a swapping process, when the limit exceeds a hard limit that may be set already. It should be noted, when there is a memory shortage or memory scarcity in the system 100, a portion of the memory beyond the soft limit may be reclaimed, causing swapping to kick-in.

In case of high congestion, the threshold limit may be increased, and a reward may be given accordingly. For a below threshold limit condition, the memory may be allocated and for an above threshold condition, polling may be performed. In case of no change in the threshold limit, normal action or no action (for example, no change in memory allocation) may be taken.

Further, based on the container ID and time stamp of creation details of the container input provided to the resource allocation threshold identification module 106, a Neural Network (NN) model may be generated. The NN may include a number of layers that are based on historical data and the resource allocation patterns. Further, final allocation attributes from the NN model and the request generation/consolidation module 104 may be refined to find the best possible allocation. For this, weighted average of outcomes using the NN model may be determined. It should be noted that one of a K-Nearest Neighbor (KNN) and maximum polling techniques may be used to determine the weighted average.

In the KNN based NN model, an output data of container's resource requirement is taken as an input parameter and is verified with K-Nearest containers. A difference among each two CPU and memory values of each two of the containers may be calculated, for example, between the CPU and memory values corresponding to a container 'A' and a container 'B'. An absolute value of the difference may be a yardstick to measure the distance and 'K' neighbors with a minimum absolute value that may be further considered for verification. The output values of KNN based NN models may be compared to check whether an anomaly is present or not.

By way of an example, the CPU and memory values for the container 'A' are 30% and 450 MB, and for the container '13' are 15% and 250 MB. In that case, the absolute difference between these two containers may be considered. Similarly, this operation may be carried out for all the remaining neighbors (say, containers). Available memory information may be computed, based on repeated comparisons. Finally, a weighted average sum may be considered as the best value to be allocated for the requested container. If the container resources are found to be beyond the limits, then a state corresponding to the requested container is marked as value beyond limits. Further, a maximum polling based NN model may also be employed that will be explained in detail further in conjunction to FIG. 2.

The micro-slot allocation module 108 may be configured for identifying and allocating micro-slots of the resources to all the containers, requesting for resource based on their criticality. Additionally, the micro-slot allocation module 108 may decide the resource allocation based on overall container execution time and various resource allocation times. It should be noted, a greedy algorithm may be used, using a local heuristic data with a local optimal choice at each stage of CPU and memory allocation. The micro-slot allocation module 108 may continue to allocate micro-slots of the resources until the final optimum allocation decision is made. Criticality and priority of the containers may be decided based on their usage and cases for which the containers are being used. The micro-slots' allocation may be further discussed in greater detail in conjunction to the FIG. 5.

Once the critical containers are decided based on the polling and are allocated with the appropriate resources, the resource utilization monitoring module 110 may perform its function. The resource utilization monitoring module 110 may allocate rewards to the micro-services based on a state-action pair using a time step function. Further, a plurality of state-action pairs may be captured and rewarded based on the priority, criticality and exact requirement, and decision. By executing the state-action pair comparisons, various decision may be taken. Also, input parameters generated by the micro-slot allocation module 108 like the CPU, and the memory limits, may be used by the resource utilization monitoring module 110, for CPU "UTIL_THR-SHD" and for Memory "soft_limit_in_bytes" and "limit_in_bytes". The output of the resource utilization monitoring module 110 as "State-Action-Reward-State-Action" based parameters may be further fed into the docker container repository 114 or the resource allocation module 112.

The resource allocation module 112 may be configured to allocate a final CPU and memory to a particular container. All the required inputs of the micro-slot allocation module 108 may be combined in order to decide a section of the CPU and the memory for each of the containers to be used. The OS, applications, or utilities running on the OS may be probed for the resources using two techniques namely, "procfs" and "sysfs". The "procfs" and "sysfs" may help in displaying effective resource utilization of any containerized application. All the containerized processes may lie within their own namespaces that may be defined by their own kernel engine.

Also, there is one more utility called as "virtual sysfs". The "virtual sysfs" may be created and triggered when a request is received or probe happens from the system resources and "virtual sysfs." In response, the calculated effective resources may be returned to the system 100. When a container is launched freshly, the container may be assigned with a per-container 'init' process to set up the namespaces including the added new "sys_namespace" and set of CPU and/or memory resources. Further, the resource allocation module 112 may evaluate and consider all the utilities and parameters while allocating the CPU or the memory slots along with inputs from micro-slot allocation module 108. Finally, allocation of the resources to the plurality of micro-services may be transmitted and stored in the coupled docker container repository 114 for future allocation of the resources.

Figure 2:
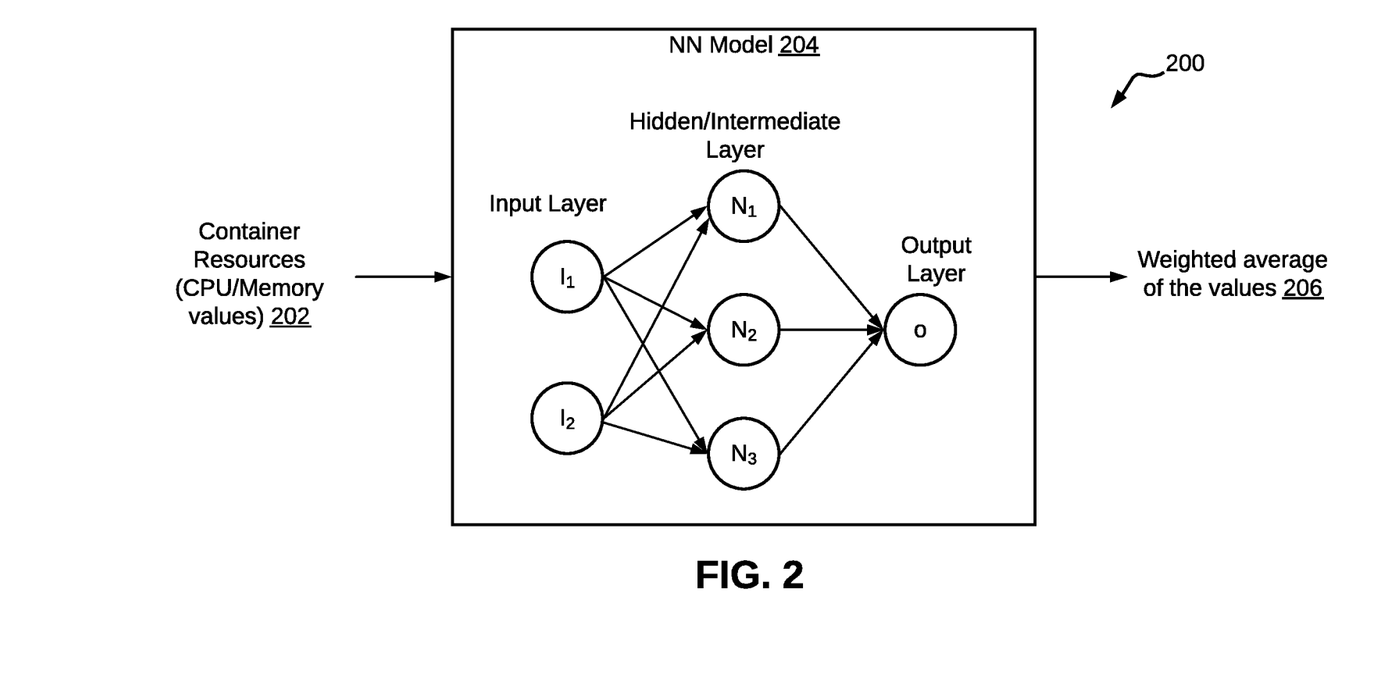
FIG. 2 is block diagram of an exemplary system for evaluating weighted average of container resources using a maximum polling based Neural Network (NN) model, in accordance with some embodiments of the present disclosure.

Referring now to FIG. 2, a system 200 for evaluating weighted average of the container resources using the maximum polling based NN model 204 is depicted, in accordance with some embodiments of the present disclosure. The NN model 204 may include three layers, an input later with nodes '$I_1$' and '$I_2$', an intermediate/hidden layer with nodes '$N_1$', '$N_2$', '$N_3$', and an output layer with node 'o'. It is clearly seen in the system 200 that container resources 202 (say, CPU/memory values) from the plurality of containers may be fed to the NN model 204. Thereafter, a weighted average of the CPU/memory values 206 may be generated by the NN model 204 using the maximum polling technique, as depicted in the system 200.

In the maximum polling technique, used by the NN model 204, each of the container resources 202 may indicate requirement of the resources corresponding to each of the container resources 202, i.e., whether a container needs extra resource or not. The requirement of the resources may be decided based on a comparison among the containers. In case the container needs extra CPU and memory than the allocated CPU and memory, a vote '1' may be counted against that container. Once votes from all the containers requiring the extra CPU and memory are obtained then the container which gets maximum votes (for example, polls) may be selected as a critical container with highest requirement of the requested resources. Again, criticality of the requirement may be verified with different upcoming time instances (say, nodes $I_1$, $I_2$, $N_1$, $N_2$, $N_3$, o) and a final weighted average of resource threshold may be identified. Accordingly, the container with high requirement may be assigned with the requested resources, further the voting and requesting may go on.

It should be noted that the resource allocation device 102 may be implemented in programmable hardware devices such as programmable gate arrays, programmable array logic, programmable logic devices, or the like. Alternatively, the resource allocation device 102 may be implemented in software for execution by various types of processors. An identified engine or module of executable code may, for instance, include one or more physical or logical blocks of computer instructions which may, for instance, be organized as an object, module, procedure, function, or other construct. Nevertheless, the executables of an identified engine or module need not be physically located together but may include disparate instructions stored in different locations which, when joined logically together, comprise the identified engine or module and achieve the stated purpose of the identified engine or module. Indeed, an engine or a module of executable code may be a single instruction, or many instructions, and may even be distributed over several different code segments, among different applications, and across several memory devices.

As will be appreciated by one skilled in the art, a variety of processes may be employed for efficient utilization of resources in containers. For example, the exemplary system 100 and, the resource allocation device 102, may provide effective utilization of the resources in the containers, by the process discussed herein. In particular, as will be appreciated by those of ordinary skill in the art, control logic and/or automated routines for performing the techniques and steps described herein may be implemented by the system 100 and the associated resource allocation device 102, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
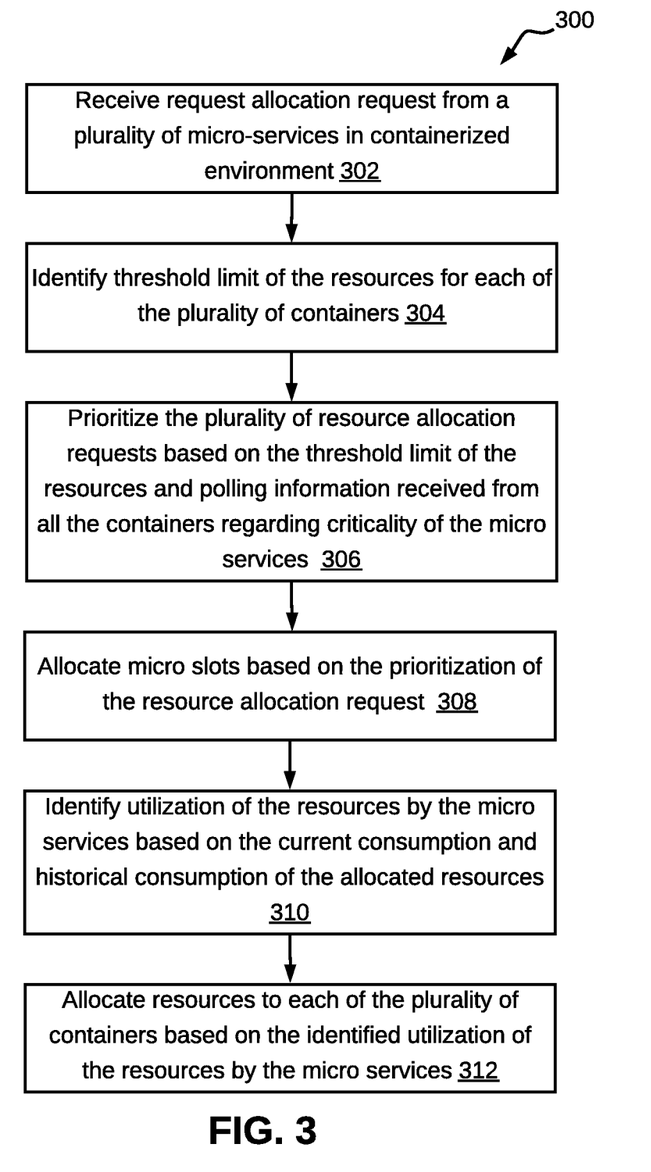
FIG. 3 is a flow diagram of a detailed exemplary process for allocating resources to containers, in accordance with some embodiments of the present disclosure.

Referring now to FIG. 3, a detailed exemplary process 300 for allocating resources to the containers is depicted via a flowchart, in accordance with some embodiments of the present disclosure. All the steps 302 to 312 of the process 300 may be performed by employing various modules 104-114 of the resource allocation device 102, discussed in conjunction to FIG. 1. At step 302, a plurality of resource allocation requests from a plurality of micro-services may be received in a containerized environment. As a request, input parameters like a container ID, a resource requirement request from the plurality of micro-services may be received by the request generation and consolidation module 104. In some embodiments, a process priority and a process table or a kernel table with multiple entries may also be received from the docker container repository 114. The resource requirement requests from the plurality of active micro services may be collated as a single request and may further be sent to the resource allocation threshold identification module 106 for identifying a resource allocation threshold or a threshold limit.

At step 304, threshold limits of the resources for each of a plurality of containers may be identified. The plurality of containers may correspond to the plurality of micro-services. It should be noted, the threshold limits may be identified by the resource allocation threshold identification module 108. In other words, a threshold level of allocation of the resources (for example, a CPU and a memory) for the plurality of micro-services may be identified. In this step, the resource allocation threshold module 108 may receive collated resource allocation request from the request generation and consolidation module 104. In one embodiment, a CPU limit for each of the micro-services running on different containers may be identified as a percentage of a ratio of container's CPU share from total busy CPU shares. In another embodiment, a CPU lower limit for each of the micro-services running on the different containers may be identified as a percentage of a ratio of container's CPU share from the total allocated CPU shares. Upon detection of available idle CPU, the available idle CPU may be released to a mainstream so that other containers may be able to consume extra required CPU.

The memory allocation and associated calculations may be performed based on two factors, i.e., "kmem limit" and 00M, control values. The control values may be available in bytes. Further, based on the criticality and priority associated with a container, the control values corresponding to the CPU/memory may be allocated/de-allocated. Once allocation/de-allocation is completed, the control values may be released back to the mainstream. It should be noted that a complete CPU/Memory usage statistic is monitored and updated continuously to the resource allocation threshold identification module 108. It may also be noted that the control values may be fetched from "cgroups" or "namespaces" in the path, "/sys/fs/cgroups".

At step 306, the plurality of resource allocation requests may be prioritized based on the threshold limit of the resources and polling information received from all the containers regarding the criticality of the micro-services. The request generation and consolidation module 104 may be used for prioritizing the plurality of resource allocation requests. In other words, the request for resource allocation may be prioritized based on polling from other active micro-services and the identification of available or free resources may be executed from active containers. Generation of polls may be executed based on priority and criticality of a particular container process that may require extra CPU and memory as compared to all other container processes.

Once the CPU/memory to be released is allocated to the particular container ID, an associated information may be received by the respective resource allocation threshold identification module 108. The resource allocation threshold identification module 108 may receive instructions on the currently allocated CPU/memory and the maximum limit of the CPU/memory to be consumed. The respective one or more applications running inside the container may not have any issue or lag since the sufficient required resources are provided. It should be noted that the threshold limit may be decided based on the historical calculations.

Further, a request consolidation may be performed, based on the polls received from all the containers, for identifying priority and criticality, so that the appropriate container may be allocated with the requested CPU and memory. Once the particular container qualifies a minimum required poll limit, the container may get the requested CPU and memory. As all the containers are participating in polling, the containers may not suffer resource crunch kind of situation.

At step 308, micro-slots may be allocated based on prioritization of the resource allocation requests. The identification and allocation of micro-slots of the resources (say, for short duration or on a temporary basis) to the plurality of micro-services requesting for additional resources may be executed by the micro slot allocation module 108. It should be noted that the micro-slot allocation depends upon the polls accumulated earlier and criticality of the application and/or process that may be running inside a system (analogues to the system 100). In some embodiments, the input parameters like advanced security-based polling inputs, time stamp of the container and respective created processes may be received. Further, the time series may be based on the time of request and the container. It should be noted that the requests may be sorted out based on priority, criticality, and time taken for execution. By way of an example, consider a situation when a container may take too much of time and continue to hold the CPU and/or memory for unlimited time. In that case, the situation may be cross verified, and some portion of un-used CPU and memory may be released to the mainstream, when possible.

Additionally, in some embodiments, a plurality of parameters may provide time slices starting from a point to other point and thereby recognize resources held by each of the containers along with time. This may be considered as one factor so that none of the containers is holding back the complete system. In some cases, when a small amount of time is required for one container, then the associated container may be assigned with highest priority and further allocated with the required resources. The micro-slots of the resources may be allocated to the plurality of containers, executing the micro-services, until a final and optimum allocation decision is made.

At step 310, utilization of the resources by the micro-services may be identified based on current consumption and historical consumption of the allocated resources. The resource utilization monitoring module 110 may generate rewards or penalize the system 100 based on correct and wrong outcomes. It should be noted that the resource utilization monitoring module 110 may use Reinforcement Learning (RL). For example, when CPU cycles and memory released for a particular container ID is appropriate and used correctly, the associated container within the system 100 may be rewarded. On other hand, when the CPU cycles and the memory is not used and held for some time, then the associated container of the system 100 may be penalized. Based on the historical data, the system 100 may continuously learn and improve itself, thus ensures better results in next iteration onwards, i.e., correct quantity of CPU cycles and/or memory is released and is used in a proper way.

At step 312, the resources may be allocated to each of the plurality of containers based on the identified utilization of the resources by the micro-services. The resource allocation module 112 may identify and allocate correct quantity of CPU cycles and the memory for the particular container or application based on the various factors as described earlier. Additionally, the system may ensure that none of the containers suffer unnecessarily due to lack of the resources. All the parameters such as container ID, process ID, quantity of the memory and the CPU cycles used and released, priority, and criticality may be stored in the docker container database 114. All the stored parameters may be further referred and re-used when needed and required for any decision making.

Figure 4:
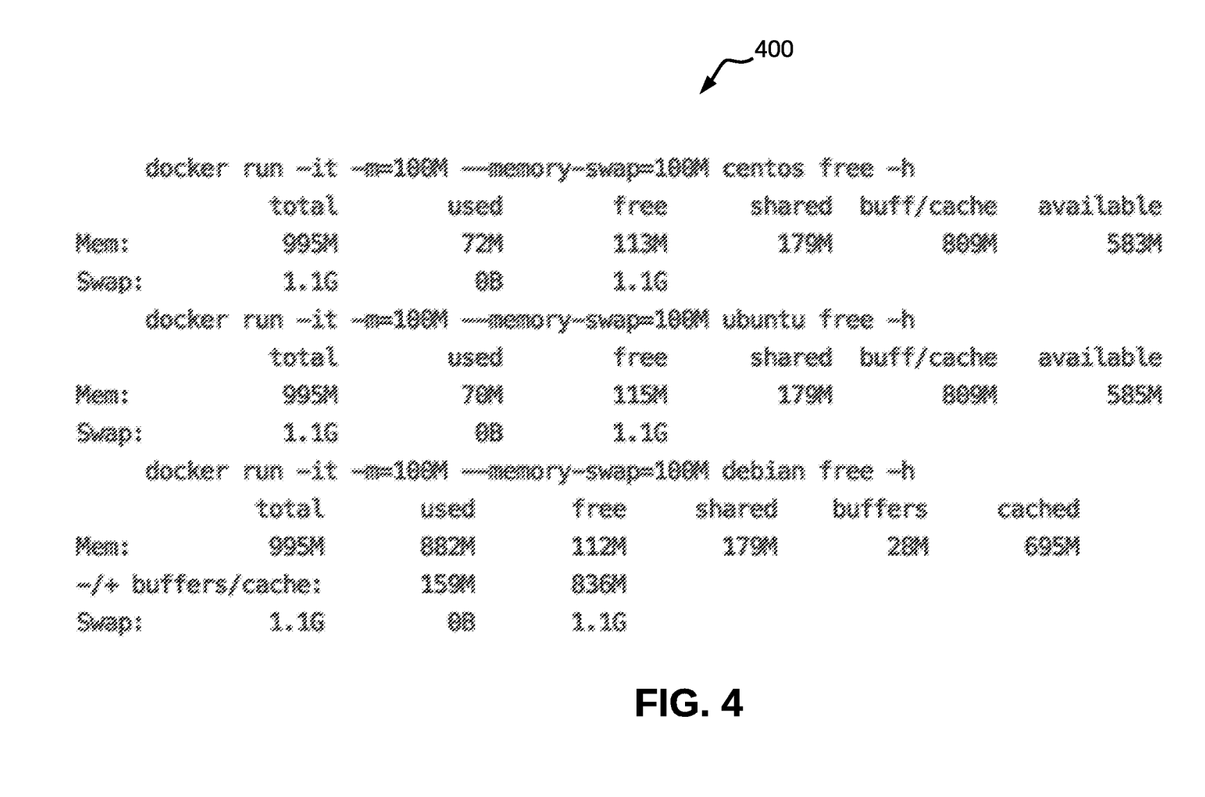
FIG. 4 is a table representing dynamic memory consumption by various container images created using different Linux Operating System variants, in accordance with some embodiments of the present disclosure.

Referring now to FIG. 4, a table 400 representing dynamic memory consumption by various container images created using different Linux Operating System variants is depicted, in accordance with some embodiments of the present disclosure. In the table 400 three different exemplary container images are considered. It should be noted that each of the container images may be associated with different OSs. A total memory '995' MB is available for each of the three container images. For a first container image of the table 400, used and free spaces are '72' MB and '113' MB, respectively. Further, shared, cache, and available memory space values are '179' MB, '809' MB and '583' MB, respectively. Similarly, for other two container images, the used, free, share, cache, and available memory spaces are mentioned in the table 400. Although the total memory available for all container images is same, but the free memory for each of the container images is different. This may be because of swap memory and buffer/cache memory allocation, as handling and management for OS corresponding to each of the container images differs. With the table 400, dynamic memory allocation and handling of memory to the respective container images may be performed along with criticality and polling mechanisms as explained in earlier embodiments.

Figure 5:
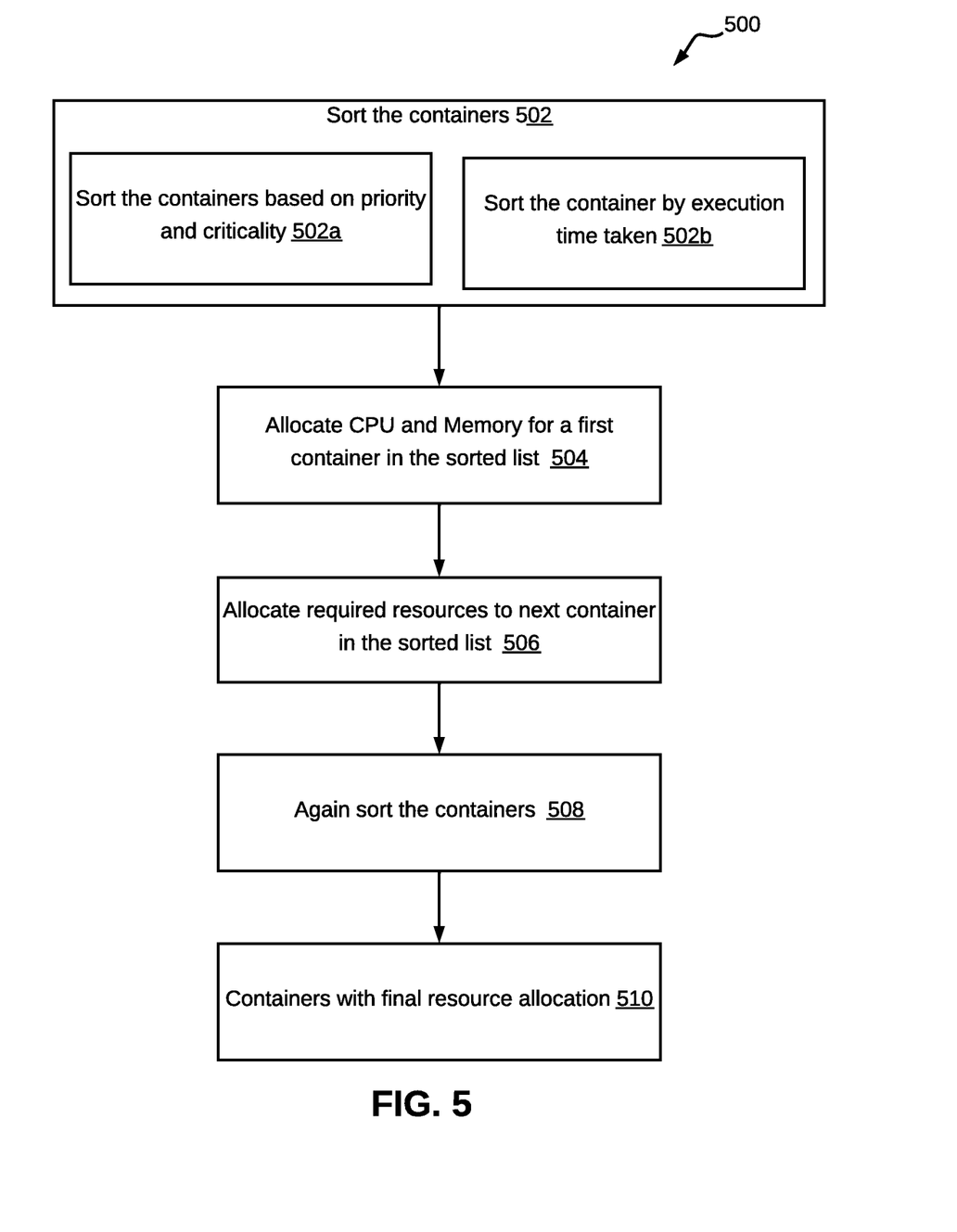
FIG. 5 is a flowchart of an exemplary process for micro slot allocation in containers, in accordance with some embodiments of the present disclosure.

Referring now to FIG. 5, an exemplary process 500 for micro slot allocation in containers is depicted, via a flowchart, in accordance with some embodiments of the present disclosure. Further, all the steps from 502 to 510 of the process 500 may be performed by micro slot allocation module 108. At step 502, the containers may be sorted in a sequence to form a sorted list of the containers (say, a stack). For sorting the containers in a sequence, two sub steps 502a and 502b may be performed. At step 502a, the containers may be sorted based on priority and criticality. On the other hand, at step 502b, the containers may be sorted based on execution time taken by the containers. To sort the containers, a comparison among the containers or container IDs associated with respective containers may be performed.

At step 504, a CPU or a memory may be allocated to a first container present at top in the sorted list. The first container may be the most critical container that requires extra memory. Thereafter, at step 506, all the required resources may be allocated to a container next to the first container in the sorted list. Further, at step 508, all the containers are sorted again to form a new sorted list. It should be noted that the step 508 may be performed in a similar way to the step 502. Finally, at step 510, an optimum final allocation of micro slots of the resources may be provided to the containers, based on a decision made by the micro-slot allocation module 108.

Figure 6:
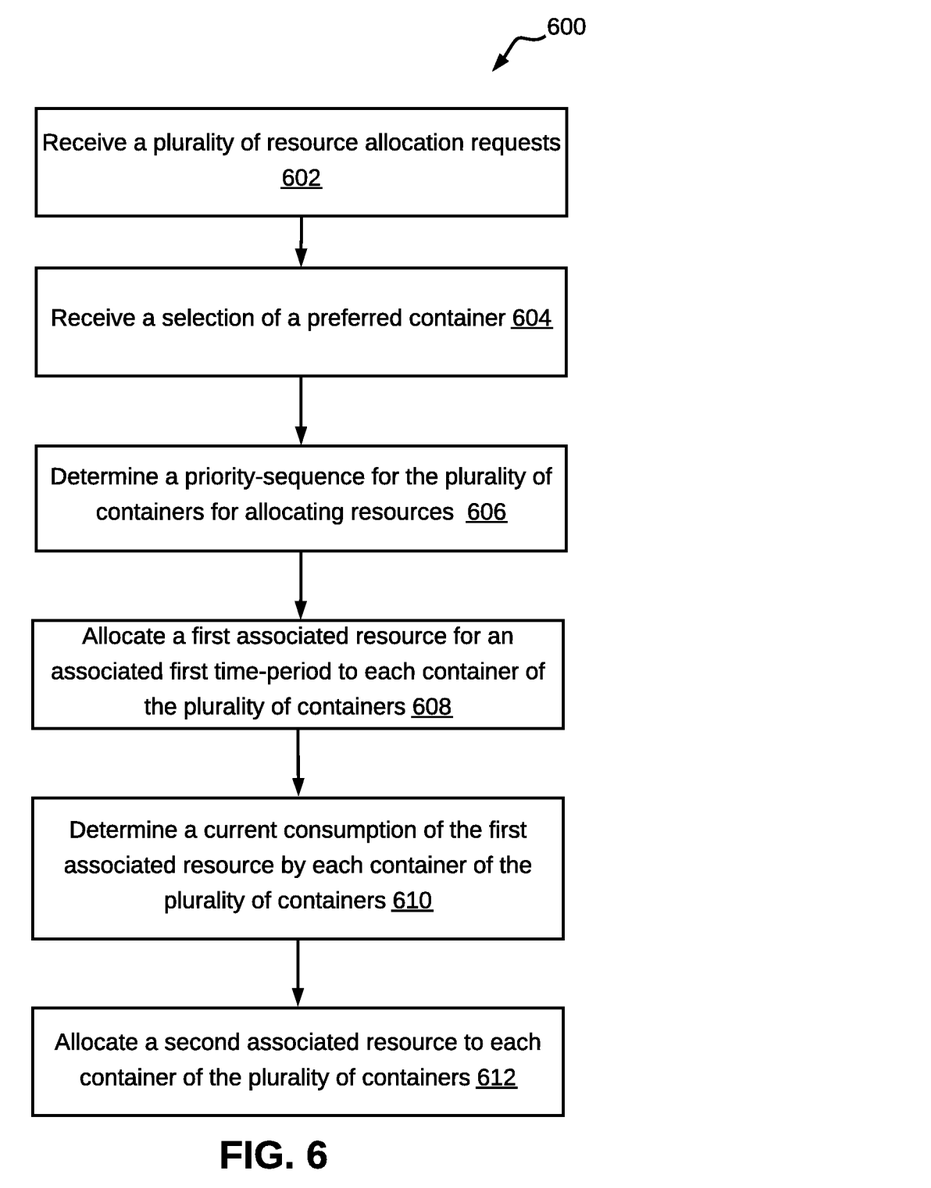
FIG. 6 is a flowchart of an exemplary process for allocating resources to containers, in accordance with some embodiments of the present disclosure.

Referring now to FIG. 6, a process 600 for allocating resources to containers is depicted via a flowchart, in accordance with some embodiments of the present disclosure. Each of the steps 602-614 may be performed using the resource allocation device 102. At step 602, a plurality of resource allocation requests may be received from a plurality of containers. At step 604, a selection of a preferred container from each of the plurality of containers may be received for allocating a resource. It should be noted that a polling session may be performed to receive the preference from each of the plurality of containers. Also, it should be noted that the preference may be based on the criticality of requirement associated with each container of the plurality of containers.

At step 606, a priority-sequence for the plurality of containers may be determined for allocating resources. Further, the priority-sequence may be determined based on the preference from each of the plurality of containers. The preference may be further based on one or more parameters including a size of memory, a duration of availability of the memory, a processing capability, and a power requirement. In some embodiments, a level of resource requirement associated with each container of the plurality of containers may be received.

Further, in some embodiments, a collated resource allocation request may be calculated by collating the plurality of resource allocation requests from the plurality of containers. Additionally, in some embodiments, a threshold resource requirement associated with each container of the plurality of containers may be determined. It should be noted that to determine a threshold resource requirement, the level of resource requirement associated with each container of the plurality of containers and collated resource allocation request may be considered. In some embodiments, the priority-sequence may be determined based on the threshold resource requirement associated with each container of the plurality of containers.

Thereafter, at step 608, a first associated resource may be allocated for an associated first time-period to each container of the plurality of containers. It should be noted that the first time-period associated with each container of the plurality of containers may depend upon the time taken for allocating the second resource to each container of the plurality of containers. The determined priority sequence may be used to allocate the first associated resource. At step 610, a current consumption of the first associated resource may be determined by each container of the plurality of containers during the associated first time-period.

At step 612, a second associated resource may be allocated to each container of the plurality of containers. The second associated resource may be allocated based on the current consumption of the first associated resource by each container of the plurality of containers. In some embodiments, a historical consumption of resources may be received by each container of the plurality of containers. Additionally, in some embodiments, based on the current consumption of the first resource and the historical consumption of resources, the second resource may be allocated to each container of the plurality of containers. Also, it should be noted that a reinforcement learning model may be used to allocate the second resource to each container of the plurality of containers. In some embodiments, the first resource and the second resource allocated to each container of the plurality of containers may be compared. Further, based on the comparison, the resource allocation device may be trained.

The system and method of the present disclosure may be hosted as a service over a cloud to allocate resources. Moreover, the present disclosure may offer some benefits intending to solve the problems encountered in conventional systems and methods, by providing effective resource utilization. The benefits offered by the disclosure may include transparent resource allocation, self-improvement of resource allocation as historical resource utilization by the micro-services may be considered before allocating resources, and fine grain level allocation. Additionally, in the present disclosure each sub process and each module are completely aware of containerized environment and available resources.

Figure 7:
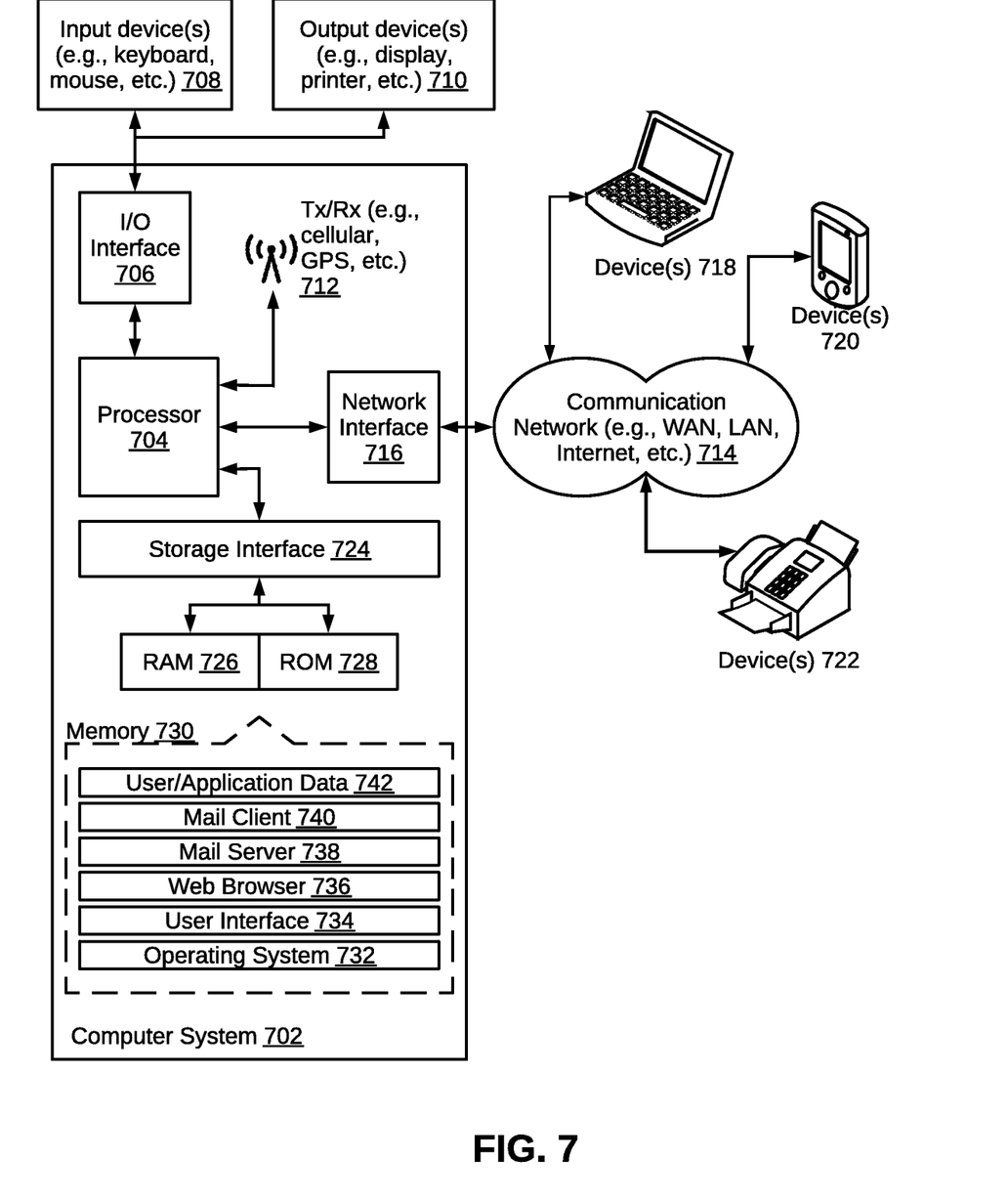
FIG. 7 illustrates a block diagram of an exemplary computer system for implementing embodiments consistent with the present disclosure.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for allocating resources to containers. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of allocating resources to containers, the method comprising:
    receiving, by a resource allocation device, a plurality of resource allocation requests from a plurality of containers;
    upon receiving the plurality of resource allocation requests, receiving, by the resource allocation device, a preference of a container from each of the plurality of containers for allocating a resource, wherein the preference from each of the plurality of containers is received via a polling session, and wherein the preference is based on a criticality of requirement associated with each container of the plurality of containers;
    determining, by the resource allocation device, a priority-sequence for the plurality of containers for allocating resources, based on the preference from each of the plurality of containers;
    allocating, by the resource allocation device, a first associated resource for an associated first time-period to each container of the plurality of containers, based on the priority-sequence;
    determining, by the resource allocation device, a current consumption of the first associated resource by each container of the plurality of containers during the associated first time-period; and
    allocating, by the resource allocation device, a second associated resource to each container of the plurality of containers, based on one of the current consumption of the first associated resource by each container of the plurality of containers, and the current consumption of the first associated resource and a historical consumption of resources by each container of the plurality of containers, wherein the historical consumption of resources is received by each container of the plurality of containers,
    wherein determining the priority-sequence further comprises:
    receiving a level of resource requirement associated with each container of the plurality of containers;
    calculating a collated resource allocation request by collating the plurality of resource allocation requests from the plurality of containers;

determining a threshold resource requirement associated with each container of the plurality of containers based on the level of resource requirement associated with each container of the plurality of containers and collated resource allocation request; and determining the priority-sequence based on the threshold resource requirement associated with each container of the plurality of containers.

2. The method of claim 1, wherein the preference is further based on one or more parameters comprising a size of memory, a duration of availability of the memory, a processing capability, and a power requirement.

3. The method of claim 1, wherein the first time-period associated with each container of the plurality of containers is based on the time taken for allocating the second associated resource to each container of the plurality of containers.

4. The method of claim 1, wherein allocating the second associated resource to each container of the plurality of containers is further based on a reinforcement learning model.

5. The method of claim 1, further comprising comparing the first associated resource and the second associated resource allocated to each container of the plurality of containers, wherein the resource allocation device is trained based on the comparison.

6. A system for allocating resources to containers, the system comprising:
a processor; and
a memory communicatively coupled to the processor, wherein the memory stores processor-executable instructions, which, on execution, causes the processor to:
receive a plurality of resource allocation requests from a plurality of containers;
receive a preference of a container from each of the plurality of containers for allocating a resource upon receiving the plurality of resource allocation requests, wherein the preference from each of the plurality of containers is received via a polling session, and wherein the preference is based on a criticality of requirement associated with each container of the plurality of containers;
determine a priority-sequence for the plurality of containers for allocating resources, based on the preference from each of the plurality of containers;
allocate a first associated resource for an associated first time-period to each container of the plurality of containers, based on the priority-sequence;
determine a current consumption of the first associated resource by each container of the plurality of containers during the associated first time-period; and
allocate a second associated resource to each container of the plurality of containers, based on one of the current consumption of the first associated resource by each container of the plurality of containers, and the current consumption of the first associated resource and a historical consumption of resources by each container of the plurality of containers, wherein the historical consumption of resources is received by each container of the plurality of containers,
wherein the processor-executable instructions further cause the processor to determine the priority-sequence by:
receiving a level of resource requirement associated with each container of the plurality of containers;

calculating a collated resource allocation request by collating the plurality of resource allocation requests from the plurality of containers;
determining a threshold resource requirement associated with each container of the plurality of containers based on the level of resource requirement associated with each container of the plurality of containers and collated resource allocation request; and
determining the priority-sequence based on the threshold resource requirement associated with each container of the plurality of containers.

7. The system of claim 6, wherein the preference is further based on one or more parameters comprising a size of memory, a duration of availability of the memory, a processing capability, and a power requirement.

8. The system of claim 6, wherein the first time-period associated with each container of the plurality of containers is based on the time taken for allocating the second associated resource to each container of the plurality of containers.

9. The system of claim 6, wherein allocating the second associated resource to each container of the plurality of containers is further based on a reinforcement learning model.

10. The system of claim 6, wherein the processor compares the first associated resource and the second associated resource allocated to each container of the plurality of containers, and the resource allocation device is trained based on the comparison.

11. A non-transitory computer-readable medium, for allocating resources to containers, having stored thereon, a set of computer-executable instructions causing a computer comprising one or more processors to perform steps comprising:
receiving a plurality of resource allocation requests from a plurality of containers;
upon receiving the plurality of resource allocation requests, receiving, a preference of a container from each of the plurality of containers for allocating a resource, wherein the preference from each of the plurality of containers is received via a polling session, and wherein the preference is based on a criticality of requirement associated with each container of the plurality of containers;
determining a priority-sequence for the plurality of containers for allocating resources, based on the preference from each of the plurality of containers;
allocating a first associated resource for an associated first time-period to each container of the plurality of containers, based on the priority-sequence;
determining a current consumption of the first associated resource by each container of the plurality of containers during the associated first time-period; and
allocating a second associated resource to each container of the plurality of containers, based on one of the current consumption of the first associated resource by each container of the plurality of containers, and the current consumption of the first associated resource and a historical consumption of resources by each container of the plurality of containers, wherein the historical consumption of resources is received by each container of the plurality of containers,
wherein determining the priority-sequence further comprises:
receiving a level of resource requirement associated with each container of the plurality of containers;
calculating a collated resource allocation request by collating the plurality of resource allocation requests from the plurality of containers;

determining a threshold resource requirement associated with each container of the plurality of containers based on the level of resource requirement associated with each container of the plurality of containers and collated resource allocation request; and determining the priority-sequence based on the threshold resource requirement associated with each container of the plurality of containers.

12. The non-transitory computer-readable medium of claim 11 further comprising comparing the first associated resource and the second associated resource allocated to each container of the plurality of containers, wherein the resource allocation device is trained based on the comparison.

\* \* \* \* \*